(No Model.)
E. GASH.
CARPET STRETCHER.
No. 345,681. Patented July 20, 1886.
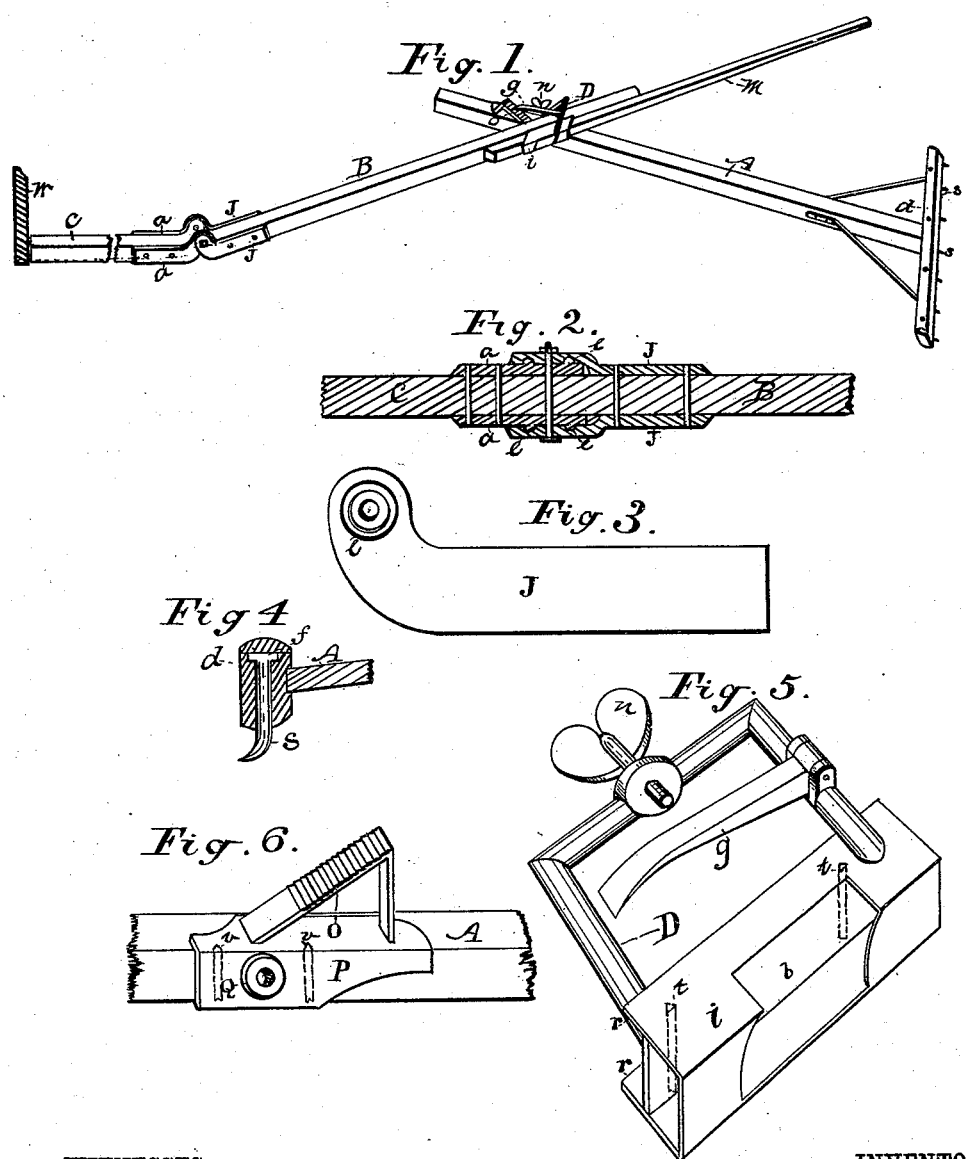
WITNESSES:
T. J. Price
J. B. Butterfield
INVENTOR
Edgar Gash

UNITED STATES PATENT OFFICE.

EDGAR GASH, OF MACOMB, ILLINOIS.

CARPET-STRETCHER.

SPECIFICATION forming part of Letters Patent No. 345,681, dated July 20, 1886.

Application filed November 17, 1885. Serial No. 183,082. (No model.)

*To all whom it may concern:*

Be it known that I, EDGAR GASH, of Macomb, in the county of McDonough and State of Illinois, have invented certain new and useful Improvements in Carpet-Stretchers, of which the following is a full and exact description, which will enable others skilled in the art to make and use the same, reference being had to the accompanying drawings, and to the letters of reference marked thereon, in which—

Figure 1 is a perspective view. Fig. 2 is a longitudinal section through the hinge. Fig. 3 is a detached part of the hinge. Fig. 4 is a cross-section of the head. Figs. 5 and 6 are perspective views of the clamp.

The nature and object of this invention is to produce a device which shall possess superior advantages in point of simplicity, durability, and general efficiency. To this end it consists in certain devices in the construction of the same, which will be fully described, and hereinafter pointed out in the claim.

In the drawings, A and B represent two bars which cross each other near their inner ends. At the outer end of the bar A is firmly attached a cross-head, $d$, which is held in place by suitable braces. In this cross-head $d$ is inserted a suitable number of teeth, $s\ s$, which are T shape in form. The lower end is tapered to a point and bent outward. The object of the T-shaped head is to prevent the teeth from turning in the head $d$, it being embedded in the cross-head, (see Fig. 4,) and the cap $f$, secured over it, prevents it from raising up or turning in the head.

C represents an extension-bar. Two or three can be added, if necessary, for very large rooms. This extension-bar C is connected to the bar B by a hinge, which is formed, as shown in Figs. 2 and 3, so that the connecting-bolt is above the line of pressure, which prevents the bars C and B from raising up where they are connected by the hinge when pressure is applied to stretch the carpet. The hinge parts J J are firmly attached to the bar B, and are formed, as shown in Fig. 3, with a circular groove, $e$, in each part. The parts $a\ a$ are firmly attached to the extension-bar C, and they are provided with a circular projecting head, which fits into the circular grooves $e\ e$ in the parts J J of the hinge, (see Fig. 2,) and when secured together by the stay-bolt all lateral motion is prevented, which is very obvious when using the stretcher.

D, Fig. 5, and P, Fig. 6, represent in perspective my improved clamping device, by which the bars A and B, where they cross each other, are clamped together and held in any position required, and any required adjustment can be made.

Fig. 6 represents the opposite side of a part of the bar A, with the slide-plate P and rack O attached.

The clamp D is attached to the bars A and B, where they cross each other, in the following manner: The clamp D is placed on the bar A, and the inner end of the thumb-screw $n$ is inserted in the hole Q on the slide-plate P. The bar B is then placed in between the flanges $r\ r$ on the clamp and slid a short distance through. On the near side of this clamp D is formed a socket, in which the lever $m$ is fitted. The thumb-screw $n$ is now tightened up sufficient to cause the ribs $v\ v$ and $t\ t$, which are on the inner side of the slide-plate P and back plate, $b$, (shown in dotted lines,) to engage with their respective bars A and B, to prevent slipping, but not sufficiently tight to prevent the bars from being raised or lowered where they cross each other, the thumb-screw $n$ acting as a pivot-bolt. The bars A and B can be adjusted to the desired length by sliding them either in or out in the clamp D and slide-plate P after the thumb-screw $n$ is loosened up a little.

The operation is as follows: The operator secures the carpet to one side of the room. The stretcher is then placed in the position shown in Fig. 1. The outer end of the extension-bar C is placed against the base $w$. The operator then makes the necessary adjustment in the bars A and B by sliding them in or out, as the case may be, in the clamp D and slide-plate P until the exact length is obtained, to stretch the carpet. The operator then raises up the stretcher, as shown in Fig. 1, which draws back the cross-head $d$ sufficient to stretch the carpet when pressed down to its former position. The thumb screw $n$ is now tightened sufficient to hold the stretcher in its shown position. The pawl $g$ is placed on the rack O. The operator then engages the teeth $s\ s$ in the cross-head $d$ with the carpet, then takes hold of the extended lever $m$ and presses down, and at the same time guides the cross-head $d$, preventing the teeth from engaging with the floor, and as fast as the bars A and B are lowered by the downward pressure the pawl $g$ drops down on the rack O, from tooth to tooth, holding the stretcher in any position that it may be when the carpet is sufficiently stretched. The operator then secures the carpet to the floor, the pawl is then loosened, and the stretcher is then moved to another part, and the same operation is repeated until the carpet is stretched in every part and secured to the floor.

Having thus described my invention, what I claim as new, and desire to secure by Letters Patent, is—

In a carpet-stretcher, the clamp D, having thumb screw $n$, pawl $g$, flanges $r\ r$, ribs $t\ t$, the plate P, and rack O, in combination with the bar A, having at its outer end the cross-head $d$, provided with teeth $s\ s$, and the bar B, having the extension-bar C, attached by suitable hinges, substantially as shown and described, for the purpose specified.

EDGAR GASH.

Witnesses:
L. J. PRICE,
J. B. BUTTERFIELD.